UNITED STATES PATENT OFFICE.

JOHN PAIGE PEPPER, OF NEW BRITAIN, CONNECTICUT.

IMPROVEMENT IN MINERAL COMPOSITION RESEMBLING JASPER.

Specification forming part of Letters Patent No. 8,592, dated December 16, 1851.

*To all whom it may concern:*

Be it known that I, JOHN PAIGE PEPPER, of New Britain, in the county of Hartford and State of Connecticut, formerly of Albany, in the State of New York, have invented a new and useful Mineral Composition, which I call "Argillo-Stone," capable of being manufactured into various articles of utility and ornament, and possessing the following external characters, to wit: variegated colors distributed into clouds, spots, and figures, approaching the aspects of jasper, plain jaspery colors sometimes being produced without variegations, a vitreous luster, and breaking into sharp translucent edges and conchoidal opaque surfaces; and I do hereby declare that the following is a full and exact description of the materials of the said composition, and of the process of making the same, as invented by me.

This composition is made by the fusion of clay with alkaline matter and coloring substances. The clay employed is a silicate of alumina mixed with lime and oxide of iron. This material, having been first thoroughly dried and pulverized, is mixed with alkali soda and lime in the proportions of one hundred pounds of clay, thirty pounds of soda-ash, and ten pounds of slaked lime. These proportions may be somewhat varied without substantially varying the result, and other alkalies may be substituted for the alkali soda; but I prefer that alkali and the above-stated proportions of materials. The mixture thus made, which constitutes the batch of the composition, is fused and vitrified in glass-house pots, employing for this purpose a glass-house furnace running with ordinary heat. The processes are then continued as follows: sulphate of copper or blue vitriol, in the proportion of one pound of the vitriol to two hundred pounds of the batch, is thrown into the pots containing the melted material, and, becoming disseminated through the metal, produces the variegation of color which characterizes the jasper-stone.

The proportion of the sulphate of copper may be varied according as the colors are required to be more or less deep. Other forms of copper also may be used as substitutes for the sulphate to produce these effects; but the latter is the most available and convenient.

The metal thus produced is worked into various articles of utility and ornament by well-known mechanical processes and the annealing operations familiar to workers in vitreous metal.

What I claim as my invention, and desire to secure by Letters Patent, is—

The manufacture of a mineral composition, having the external characters above described, by the fusion of clay with alkali soda, lime, and sulphate of copper, as above described, or their equivalents, and working the composition into articles of utility and ornament in the manner above described.

JOHN PAIGE PEPPER.

Witnesses:
F. S. MYER,
H. E. RUSSELL.